(12) United States Patent
Gold et al.

(10) Patent No.: US 12,726,253 B2
(45) Date of Patent: Sep. 1, 2026

(54) NETWORK CONTROLLED REPEATER FORWARD LINK BEAM SWITCH TESTING

(71) Applicant: Nokia Technologies Oy, Espoo (FI)

(72) Inventors: Dimitri Gold, Espoo (FI); Man Hung Ng, Swindon (GB); Bartlomiej Golebiowski, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 309 days.

(21) Appl. No.: 18/634,445

(22) Filed: Apr. 12, 2024

(65) Prior Publication Data

US 2024/0348316 A1 Oct. 17, 2024

Related U.S. Application Data

(60) Provisional application No. 63/459,855, filed on Apr. 17, 2023.

(51) Int. Cl.

*H04B 7/06* (2006.01)
*H04W 16/28* (2009.01)
*H04W 24/06* (2009.01)
*H04W 88/04* (2009.01)

(52) U.S. Cl.

CPC ........ *H04B 7/06958* (2023.05); *H04W 16/28* (2013.01); *H04W 24/06* (2013.01); *H04W 88/04* (2013.01)

(58) Field of Classification Search

None

See application file for complete search history.

(56) References Cited

U.S. PATENT DOCUMENTS 11,695,456 B2 * 7/2023 Abedini ............... H04B 7/0617 375/262
12,587,822 B2 * 3/2026 Dutta .................... H04W 8/005
2022/0311503 A1 9/2022 Islam et al.

FOREIGN PATENT DOCUMENTS

CN 115516813 A 12/2022
WO 2022/253993 A2 12/2022

OTHER PUBLICATIONS

Extended European Search Report received for corresponding European Patent Application No. 24169920.6, dated Sep. 25, 2024, 9 pages.

"3rd Generation Partnership Project, Technical Specification Group Radio Access Network; NR; Repeater conformance testing Part 2: Radiated conformance testing (Release 17)", 3GPP TS 38.115-2, V17.1.0, Mar. 2023, pp. 1-99.

(Continued)

*Primary Examiner* — Hong S Cho

(74) *Attorney, Agent, or Firm* — Barta Jones, PLLC

(57) ABSTRACT

Systems, methods, apparatuses, and computer program products for network controlled repeater forward link beam switch testing. A method may include transmitting an access link beam configuration to a network controlled repeater (NCR). The method may also include initiating, by the NCR, a beam switch operation based on implementation of the received access link beam configuration. The method may further include transmitting, by NCR, an access link beam based on the beam switch operation. In addition, the method may include measuring the received access link beam of the NCR. Further, the method may include determining test metrics based on the measuring. The method may also include verifying the beam switch operation based on the test metrics.

20 Claims, 5 Drawing Sheets

(56) References Cited

OTHER PUBLICATIONS

"Revised WID on NR network-controlled repeaters", 3GPP TSG RAN Meeting #98-e, RP-223505, Agenda: 9.3.1.6, ZTE, Dec. 12-16, 2022, pp. 1-5.
"New WID on NR network-controlled repeaters", 3GPP TSG RAN Meeting #97-e, RP-222673, Agenda: 9.1.1, ZTE, Sep. 12-16, 2022, pp. 1-5.
"3rd Generation Partnership Project; Technical Specification Group Radio Access network; Study on NR network-controlled repeaters; (Release 18)", 3GPP TR 38.867, V18.0.0, Sep. 2022, pp. 1-21.
"Summary#4 of discussion on side control information", 3GPP TSG RAN WG1 #112, R1-2302035, Agenda: 9.8.1, ZTE, Feb. 27-Mar. 3, 2023, pp. 1-53.
"Summary#1 of discussion on side control information", 3GPP TSG RAN WG1 #112, R1-2301898, Agenda: 9.8.1, ZTE, Feb. 27-Mar. 3, 2023, pp. 1-50.
"3rd Generation Partnership Project; Technical Specification Group Radio Access Network; NR; NR Repeater Radio Transmission and Reception (Release 17)", 3GPP TS 38.106, V17.3.0, Dec. 2022, pp. 1-86.
"3rd Generation Partnership Project, Technical Specification Group Radio Access Network; NR; Repeater conformance testing—Part 1: Conducted conformance testing; (Release 17)", 3GPP TS 38.115-1, V17.0.0, Dec. 2022, pp. 1-100.
"3rd Generation Partnership Project; Technical Specification Group Radio Access Network; NR; Repeater conformance testing Part 2: Radiated conformance testing (Release 17)", 3GPP TS 38.115-2, V17.0.0, Dec. 2022, pp. 1-99.
"WF on NR Network-controlled Repeaters RRM requirements", 3GPP TSG-RAN WG4 Meeting #105, R4-2220708, Agenda: 8.25.4, ZTE, Nov. 14-18, 2022, 1 page.
"3rd Generation Partnership Project; Technical Specification Group Radio Access Network; NR; User Equipment (UE) radio transmission and reception; Part 4: Performance requirements (Release 17)", 3GPP TS 38.101-4, V17.7.0, Dec. 2022, pp. 1-745.
"3rd Generation Partnership Project; Technical Specification Group Radio Access Network; 5GS; User Equipment (UE) conformance specification; Part 1: Common test environment (Release 17)", 3GPP TS 38.508-1, V17.7.0, Dec. 2022, 1434 pages.
"3rd Generation Partnership Project; Technical Specification Group Radio Access Network; NR; Requirements for support of radio resource management (Release 18)", 3GPP TS 38.133, V18.0.0, Dec. 2022, 5854 pages.
"3rd Generation Partnership Project; Technical Specification Group Radio Access Network; NR; User Equipment (UE) conformance specification; Radio transmission and reception; Part 4: Performance requirements (Release 17)", 3GPP TS 38.521-4, V17.1.0, Dec. 2022, 980 pages.
"Msc-generator", Sourceforge, Retrieved on May 2, 2024, Webpage available at :https://sourceforge.net/projects/msc-generator/.
"Discussion on conformance testing requirement for NCR", 3GPP TSG-RAN WG4 Meeting#106bis, R4-2305415, Agenda: 5.29.4, ZTE Corporation, Apr. 17-26, 2023, 4 pages.
"Discussion on demodulation performance requirements for NCR-Mt", 3GPP TSG-RAN WG4 Meeting # 106bis-e, R4-2304671, Agenda: 5.29.6, ZTE Corporation, Apr. 17-26, 2023, pp. 1-10.
"Discussion on RF conformance testing for NCR", 3GPP TSG-RAN WG4 Meeting #106-bis-e, R4-2304447, Agenda: 5.29.4, CATT, Apr. 17-26, 2023, 6 pages.
"NCR conformance testing", 3GPP TSG-RAN WG4 Meeting #106bis-e, R4-2304533, Agenda: 5.29.4, Nokia, Apr. 17-26, 2023, 4 pages.
"On NCR Demodulation Performance Requirements", 3GPP TSG-RAN WG4 Meeting #106bis-e, R4-2304459, Agenda: 5.29.6, Nokia, Apr. 17-26, 2023, 5 pages.

* cited by examiner

NETWORK CONTROLLED REPEATER FORWARD LINK BEAM SWITCH TESTING

FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for network controlled repeater forward link beam switch testing.

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, fifth generation (5G) radio access technology or NR access technology, and/or 5G-Advanced. 5G wireless systems refer to the next generation (NG) of radio systems and network architecture. 5G network technology is mostly based on NR technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT. For instance, capabilities of NR may be enhanced via implementation of radio frequency (RF) repeaters, which can provide cost-effective means of extending network coverage by supplementing the coverage provided by regular full-stack cells. However, due to the current state of conventional repeaters, there is a need to ensure reliability in beam switching at the repeater.

SUMMARY

Some example embodiments may be directed to a method. The method may include transmitting an access link beam configuration to a NCR. The method may also include initiating, by the NCR, a beam switch operation based on implementation of the received access link beam configuration. The method may further include transmitting, by the NCR, an access link beam based on the beam switch operation. In addition, the method may include measuring the received access link beam of the NCR. Further, the method may include determining test metrics based on the measuring. The method may also include verifying the beam switch operation based on the test metrics.

Other example embodiments may be directed to an apparatus. The apparatus may include at least one processor and at least one memory including computer program code. The at least one memory and computer program code may be configured to, with the at least one processor, cause the apparatus at least to transmit an access link beam configuration to a NCR. The apparatus may also be caused to initiate a beam switch operation based on implementation of the received access link beam configuration. The apparatus may further be caused to transmit an access link beam based on the beam switch operation. In addition, the apparatus may be caused to measure the received access link beam of the NCR. Further, the apparatus may be caused to determine test metrics based on the measuring. The apparatus may also be caused to verify the beam switch operation based on the test metrics.

Other example embodiments may be directed to an apparatus. The apparatus may include means for transmitting an access link beam configuration to a NCR. The apparatus may also include means for initiating a beam switch operation based on implementation of the received access link beam configuration. The apparatus may further include means for transmitting an access link beam based on the beam switch operation. In addition, the apparatus may include means for measuring the received access link beam of the NCR. Further, the apparatus may include means for determining test metrics based on the measuring. The apparatus may further include means for verifying the beam switch operation based on the test metrics.

In accordance with other example embodiments, a non-transitory computer readable medium may be encoded with instructions that may, when executed in hardware, perform a method. The method may include transmitting an access link beam configuration to a NCR. The method may also include initiating, by the NCR, a beam switch operation based on implementation of the received access link beam configuration. The method may further include transmitting, by the NCR, an access link beam based on the beam switch operation. In addition, the method may include measuring the received access link beam of the NCR. Further, the method may include determining test metrics based on the measuring. The method may also include verifying the beam switch operation based on the test metrics.

Other example embodiments may be directed to a computer program product that performs a method. The method may include transmitting an access link beam configuration to a NCR. The method may also include initiating, by the NCR, a beam switch operation based on implementation of the received access link beam configuration. The method may further include transmitting, by the NCR, an access link beam based on the beam switch operation. In addition, the method may include measuring the received access link beam of the NCR. Further, the method may include determining test metrics based on the measuring. The method may also include verifying the beam switch operation based on the test metrics.

Other example embodiments may be directed to an apparatus that may include circuitry configured to transmit an access link beam configuration to a NCR. The apparatus may also include circuitry configured to initiate a beam switch operation based on implementation of the received access link beam configuration. The apparatus may further include circuitry configured to transmit an access link beam based on the beam switch operation. In addition, the apparatus may include circuitry configured to measure the received access link beam of the network controlled repeater. Further, the apparatus may include circuitry configured to determine test metrics based on the measuring. The apparatus may also include circuitry configured to verify the beam switch operation based on the test metrics.

BRIEF DESCRIPTION OF THE DRAWINGS

For proper understanding of example embodiments, reference should be made to the accompanying drawings, wherein.

DETAILED DESCRIPTION

Figure 1:
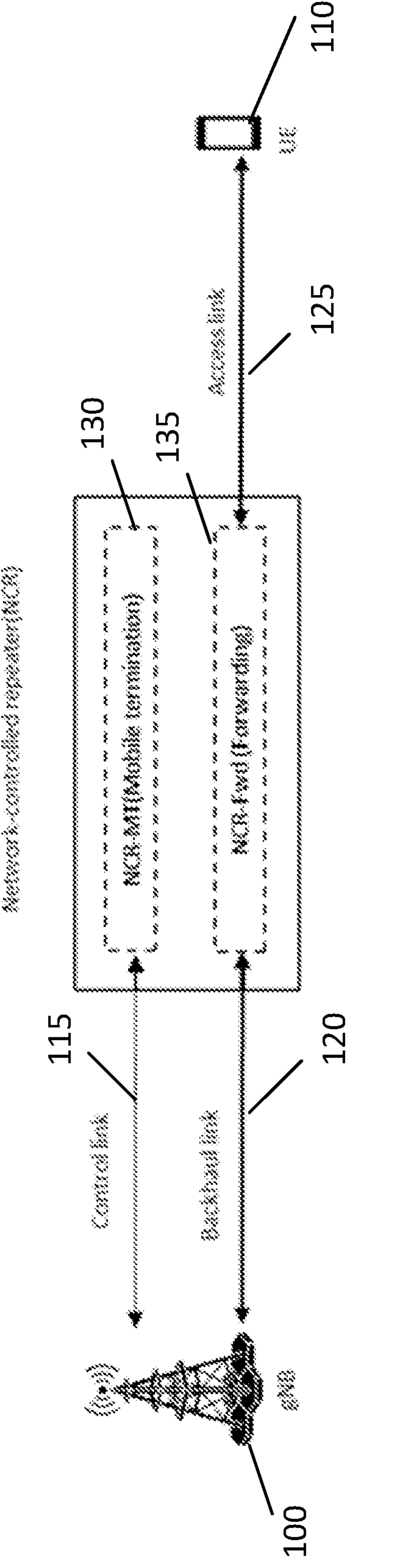
FIG. 1 illustrates an example of a network controlled repeater.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for network controlled repeater (NCR) forward link beam switch testing.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "base station", "cell", "node", "gNB", "network" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Radio frequency (RF) repeaters may provide a cost-effective means of extending network coverage, and may be used in a wide range of deployments in, for example, 2G, 3G, 4G and 5G to supplement coverage provided by regular full-stack cells. An NCR may provide an enhancement over conventional RF repeaters with the capability to receive and process side control information (e.g., beam information, ON-OFF information, and time division duplex (TDD) downlink-uplink (DL-UL) configuration) from the network. For example, a control ink (C-link) of the NCR provides a way for a network controlled repeater mobile termination (NCR-MT) to connect with the network. The NCR-MT is responsible for controlling a network controlled repeater forwarding (NCR-Fwd) part. Additionally, the NCR-MT may not need to receive any user data, and may instead receive side control information needed for operating the NCR-MT itself, and for the control of NCR-Fwd.

As described above, the NCR may process side control information. Side control information refers to the part of control traffic over the C-link of the NCR-MT that is dedicated to the control of NCR-Fwd. The side control information may include at least, for example, beam management of the backhaul link (is not expected to change frequently once configured due to static nature of NCR), and beam confirmation and indication for an access link. The access link may dynamically change because the access UEs movement may need to use different beams.

New Radio (NR) NCRs have been performed in the technical specifications of the 3$^{rd}$ Generation Partnership Project (3GPP). FIG. 1 illustrates an example of an NCR. As illustrated in FIG. 1, the NCR 105 may be in communication with a gNB 100 and a user equipment (UE) 110. The NCR 105 may include an NCR-MT element 130, and an NCR-Fwd element 135. As illustrated in FIG. 1, the NCR-MT may communicate with the gNB 100 via a C-link 115, the NCR-Fwd 135 may communicate with the gNB 100 via a backhaul link 120, and the NCR-Fwd 135 may communicate with the UE 110 via an access link 125.

As illustrated in FIG. 1, the NCR-MT may be defined as a functional entity to communicate with the gNB 100 via a C-link 115 to enable exchange of control information. The control information may include, for example, side control information at least for the control of the NCR-Fwd 135. The C-link 115 may be based on a NR Uu interface, and the NCR-Fwd 135 may be defined as a function entity to perform the amplifying-and-forwarding of UL/DL RF signal(s) between the gNB 100 and the UE 110 via the backhaul link 120 and the access link 125. The behavior of the NCR-Fwd 135 may be controlled according to side control information received from the gNB 100.

The beam to be used in the access link 125 may be configured in various ways. For example, the beam may be configured as an aperiodic beam indication. The aperiodic beam indication may be provided with downlink control information (DCI) format 5_0 carrying the side control information. A new DCI format may include $T_{max}$ time resource field=$L_{max}$ beam identifier (ID) fields with one-to-one mapping, and the time resource may include slot offset (0, . . . , 14). Up to 112 time resources may be configured, and up to maxNrofBeamIndex-1 beam IDs may be configured. Further, maxNroBeamIndex may be 64 in Frequency Range 2 (FR2). Additionally, a time reference for the aperiodic beam indication may begin k slots after the slot in which DCI is received, where k corresponds to the NCR capability.

The beam may also be configured as a semi-persistent beam indication. Here, radio resource control (RRC) signaling may be used to configure Y lists, where the y-th entity may include $1<=Z_y<=128$ forwarding resources (beam index and time domain resources). Each list Y may be activated/deactivated by a medium access control control element (MAC-CE). Alternatively, the beam index for $Z_y$ may be explicitly indicated in MAC-CE.

For the semi-persistent beam indication, the indicated information may be applied starting from the first slot that is after slot $$n + 3N_{slot}^{subframe,\mu},$$

where n refers to the slot in which NCR-MT would transmit hybrid automatic repeat request acknowledgment (HARQ-ACK) information corresponding to a physical downlink shared channel (PDSCH) carrying an activation command, and μ is the subcarrier spacing (SCS) configuration for the channel carrying the HARQ-ACK information.

The beam may further be configured as a periodic beam indication, where the NCR node may have an ON/OFF configuration. The ON/OFF behavior of the NCR-Fwd 135 may be determined by an access link indication, and ON/OFF behavior of the backhaul link 120 may follow the access link 125. Additionally, the NCR-Fwd 135 may be OFF from beam failure detection to completion of beam failure recovery.

As discussed above, NCR-MT may be a new function entity for which the DL RF and demodulation requirements over the C-link and radio resource management (RRM) requirements have been agreed to be defined in the 3GPP specifications. However, because conventional RF repeaters do not have an MT component, no RF, RRM and demodulation requirements, and tests have been defined for these types of devices.

Certain aspects of NCR deployment scenarios may involve special treatment. As one example, even though the NCR-MT may have a design and functionality similar to a UE, only side control information is expected to be transmitted over the C-link. For instance, very low data volumes are expected in the form of control messages (e.g., MAC-CE and DCI). The requirement on PDSCH demodulation performance for regular UE are intended to ensure a certain level of throughput (e.g., 30% or 70% of maximum throughput) for a given signal to noise ratio (SNR). Such metrics may not be appropriate for very small data rates that are expected to be transmitted over the C-link.

Furthermore, the requirements on physical downlink control channel (PDCCH) demodulation performance may be defined based on the average probability of a missed DL scheduling grant (Pm-dsg). For instance, it may be assumed that physical uplink control channel (PUCCH) DCI was demodulated successfully, and acknowledgment/non-acknowledgment (ACK/NACK) was received for the PUCCH back to the system simulator (SS). However, transmission of beam indication DCI does not necessitate PDSCH transmission over the C-link. Thus, such a test is not appropriate in the NCR case.

The C-link may carry beam information indication for the NCR-Fwd access link. This feature may be useful for NCRs, but is not present in regular UEs or conventional RF repeaters. Further, the indication may be delivered over the C-link by the NCR-MT. However, the beam may be applied by NCR-Fwd in the access link. Thus, even when the beam indication command is received by the NCR-MT, it is not guaranteed that the access link beam has changed, and that the change happened within an allowed switch delay.

Figure 2:
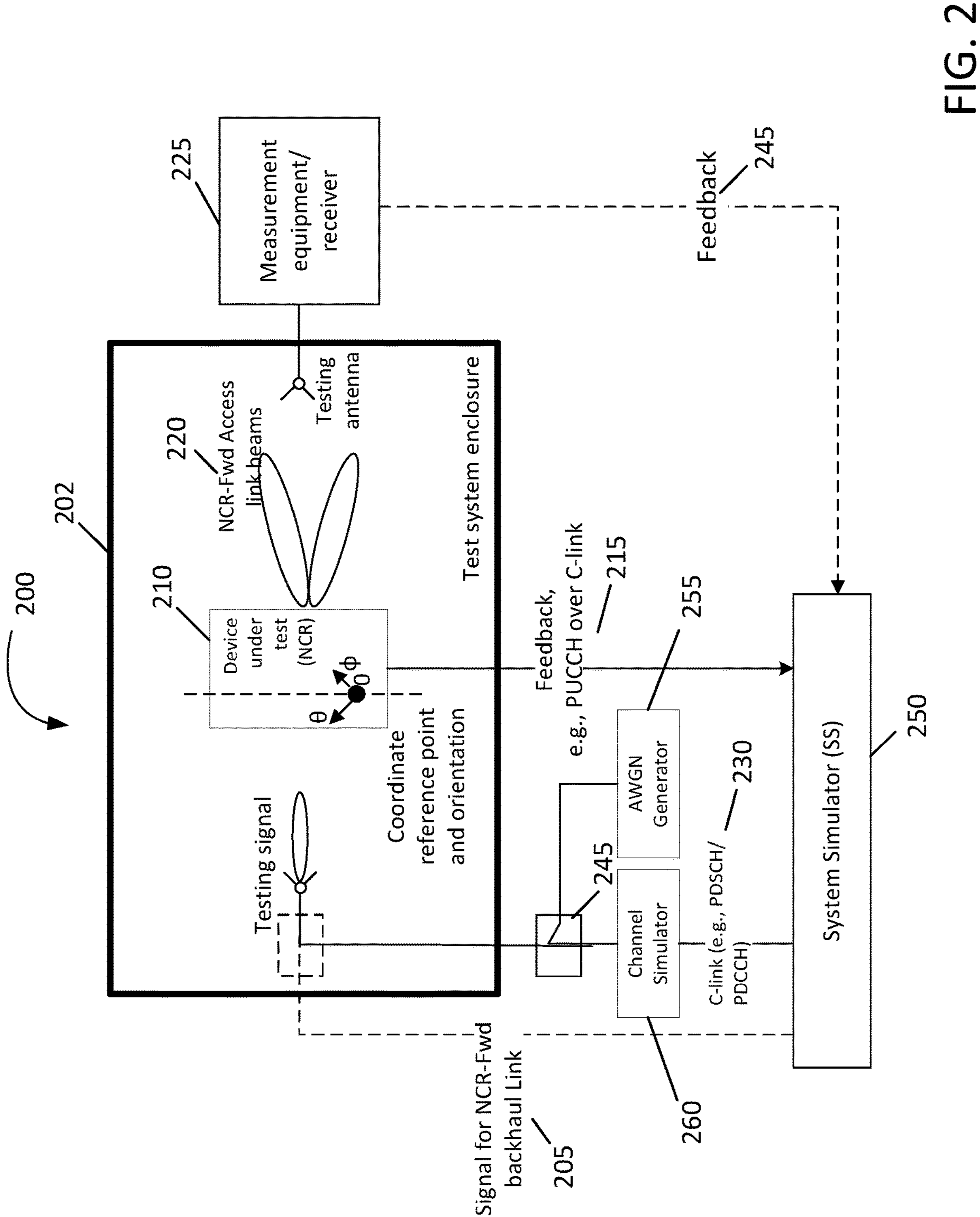
FIG. 2 illustrates an example testing setup (TS) for the network controlled repeater-forwarding (NCR-Fwd) access link change testing, according to certain example embodiments.

As described herein, certain example embodiments may define various ways to introduce core and performance requirements, and testing procedures to validate beam change in the NCR-Fwd access link based on, for example, the side control information on beam configuration, and the indication received in NCR-MT over the C-link. FIG. 2 illustrates an example testing setup (TS) 200 for the NCR-Fwd access link change testing, according to certain example embodiments. As illustrated in FIG. 2, the TS 200 may include a testing system enclosure 202. In some example embodiments, the enclosure may be an anechoic chamber, and may be used for over the air (OTA) tests. At 205, the beam configuration or indication command may be transmitted from the SS 250 to the NCR-MT of the NCR 210 over the C-link. In some example embodiments, the beam configuration or indication command may include RRC configuration, DCI over PDCCH, or in a MAC-CE over PDSCH. In certain example embodiments, the NCR 210 may decode/demodulate the beam indication, and perform beam application which may have a delay.

At 215, the NCR 210 may provide feedback to the SS 250 confirming the reception and demodulation of the beam configuration/indication command. As illustrated in FIG. 2, the feedback may be HARQ ACK/NACK feedback sent over PUCCH to the SS 250. In other example embodiments, the feedback 215 may be provided from the NCR 210 to the SS 250 via a wired connection between the NCR 210 and the SS 250.

At 220, a change of the beam at the NCR-Fwd access link may be detected by the measurement equipment/receiver 225. In some example embodiments, the beam change may be triggered either by the beam indication, or based on the configuration of time-domain resources assigned to the beam IDs.

At 225, the measurement equipment/receiver may detect the change of the beam at the NCR-Fwd access link. In some example embodiments, the detection of the change of the beam may be based on effective isotropic radiated power (EIRP) measurements. In other example embodiments, the detection of the change of the beam may be based on the ON/OFF state of the NCR-Fwd.

At 225, the measurement equipment/receiver may receive or measure the signal and the access link. The measurement equipment/receiver 225 may also demodulate the forwarded PDSCH, and feedback 245 of the demodulation may be provided to the SS 250. According to certain example embodiments, reception or measurement of the signal and the access link, demodulation of forwarded PDSCH, and transmission of the feedback may all be optional. According to other example embodiments, PDSCH over the backhaul link may be transmitted together with the C-link signal. Additionally, two separate transmitters may be present in the TS and transmit together, or one of the two transmitters may transmit separately from the other transmitter. As illustrated in FIG. 2, the TS 200 also includes an additive white Gaussian noise (AWGN) generator 255, and a channel simulator 260. The channel simulator 260 simulates the multipath fading channel effect (change in amplitude and phase as well as multipath components), while the AWGN generator 255 adds AWGN to the signal.

Certain example embodiments may provide new requirements and testing procedures for the NCR node. For instance, one example embodiment may provide NCR-MT PDCCH demodulation performance requirements, and test for the access beam switching based on DCI format 5_0 indication (see 205, 210, 220, and 225 in FIG. 2). In this example embodiment, the requirement may define the SNR level for the required average probability of a missed beam indication. Furthermore, the test in this example embodiment may combine checking of demodulation performance of the NCR-MT with the verification that the access link beam was changed by the NCR-Fwd. In certain example embodiments, the change of the beam may be verified in the test setup by OTA output power EIRP measurements of the access link.

Another example embodiment may provide an NCR-MT PDSCH demodulation performance requirement and test for the beam indication and/or switch based on a MAC-CE beam indication. In this example embodiment, the requirement may define the SNR level for the required average probability of a missed beam indication. Additionally, the requirements may be defined for demodulation performance, and the missed beam indication may be defined by the ratio in between ACK/NACK received over C-link PUSCH for the beam indication MAC-CE (see 205, 210, and 215 in FIG.

2). Alternatively, the test may combine checking of demodulation performance of NCR-MT with the verification that the access link beam was changed by the NCR-Fwd (see operations 205, 210, 220, and 225 in FIG. 2). The changing of the beam may be verified in the test setup by OTA output power EIRP measurements of the access link.

A further example embodiment may provide an RRM requirement and test where the new access link beam is indicated to the NCR in the side control information (over C-link), and the new access link may be checked that the beam has changed after a certain allowed switch delay time defined by the requirement specified in the TS (see operations 205, 210, 220, and 225 in FIG. 2). In some example embodiments, the change of the beam may be verified in the test setup by OTA output power EIRP measurements of the access link. In other example embodiments, PDSCH may be transmitted over the backhaul link of NCR-Fwd. Then, the PDSCH signal that is forwarded by the NCR-Fwd access link may be received by the signal receiver, demodulated, and compared to the sequence transmitted by the SS. In this case, operations 230-245 in FIG. 2 may also be used. In further example embodiments, the change of the beam may be concluded based on the ON/OFF state of the access link.

Another example embodiment may provide a combination of the requirements and tests described above. This requirement and test may combine all steps necessary for the access link beam change (i.e., demodulation of the beam indication command, beam switch delay, and validation of the beam switch in the access link).

As described above, certain elements of the TS and testing procedures may include verification of the NCR-Fwd access link beam change with OTA output power EIRP measurements based on the beam indication/configuration command received by the NCR-MT over the C-link. In other example embodiments, a combination of PDCCH/PDSCH demodulation performance requirement and testing of beam indication signaling at the NCR-MT with beam change verification at the NCR-Fwd access link may be provided. Certain example embodiments may also introduce new requirements and tests on the PDCCH demodulation performance for the DCI 5_0 type, and on PDSCH demodulation performance for beam indication MAC-CE. The new requirements may correspond to requirements for the NCR-MT to acknowledge the receipt of the command. However, whether the command has actually been performed is not verified.

Other example embodiments may introduce a requirement and testing on the NCR-Fwd access link beam switching latency triggered by the beam indication/configuration command. The combination of the test with demodulation of DCI or MAC-CE and beam switching verification on the RF side may be provided. Additionally, certain example embodiments may provide verification of beam switch delay based on the PDSCH transmissions forwarded by the NCR-Fwd. Extensions to the testing setup to support necessary elements (e.g., signal receiver and demodulator) may be provided. Additionally, the MAC-CE beam indication demodulation performance may be tested based on the feedback from the NCR-MT.

Figure 3:
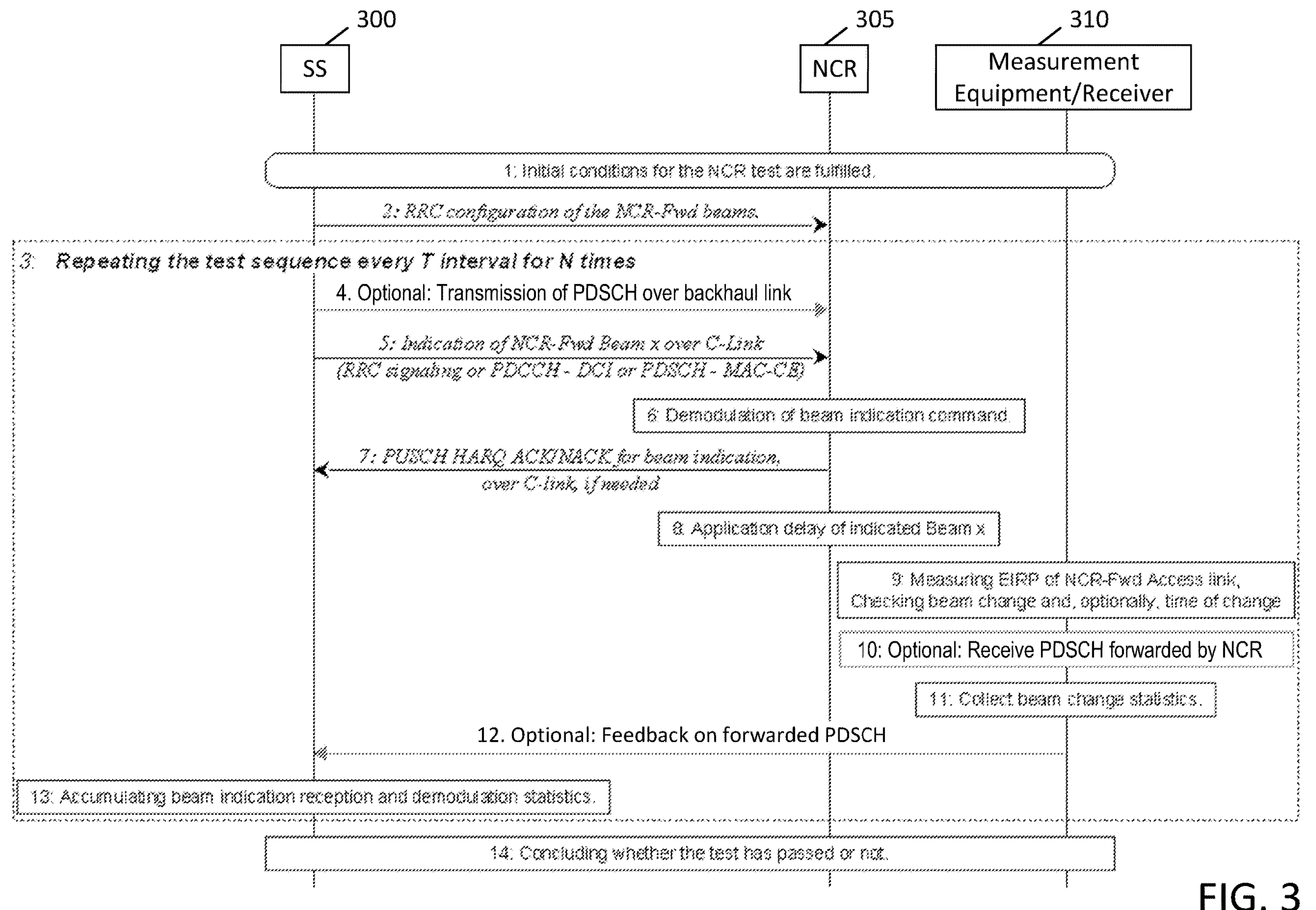
FIG. 3 illustrates an example signal diagram of an access link beam change testing procedure, according to certain example embodiments.

FIG. 3 illustrates an example signal diagram of an access link beam change testing procedure, according to certain example embodiments. As illustrated in FIG. 3, the signal diagram includes operations between the SS 300, NCR 305, and measurement equipment/receiver 310. The NCR 305 include elements of the NCR-MT and NCR-Fwd. At operation 1, initial conditions may be a set of test configurations that the NCR node may need to be tested in, and may include the steps for the SS 300 and the NCR node 305 to execute to reach the correct measurement state (e.g., setup is configured according to the test parameters, NCR-MT may be in the RRC CONNECTED state, and PDCCH and PDSCH may be configured. At operation 2, RRC configuration of the NCR-Fwd beams may be transmitted to the NCR 305 from the SS 300. In some example embodiments, operation 2 may be part of operation 1, but may be specific for NCR-MT because the configuration of the NCR-Fwd access link beams may be provided before the test. For example, the number of beams, beam IDs, time resources of the beams, depending on the type of beam indication (aperiodic, semi-persistent, or periodic).

At operation 3, the test may include multiple repetitive steps (sub-test) that are repeated periodically with a certain periodicity (T) and for a number of times (N) sufficient to achieve statistically reliable results. Additionally, as illustrated in FIG. 3, operation 3 may collectively include operations 4-13. At operation 4, the SS 300 may optionally generate and transmit PDSCH traffic to the NCR 305 to be forwarded by the NCR-Fwd. In some example embodiments, if the NCR-Fwd traffic needs to be transmitted (e.g., to evaluate beam switching delays (interruption in the traffic), or ON/OFF periods), then PDSCH over backhaul link can be transmitted.

At operation 5, a beam change indication may be transmitted by the SS 300 over the C-link. Depending on the initial conditions and test configuration, the beam change indication may be transmitted via RRC or MAC-CE signaling transmitted over PDSCH or DCI 5_0 over PDCCH. In some example embodiments, when only demodulation performance is tested (205 and 210 in FIG. 2), the specific structure of the DCI or MAC-CE may not be followed, and only the size of the payload may be followed. In other words, when the specific structure as defined in the specifications of 3GPP is not followed, the payload may be filled with random data bits. In other example embodiments, in each sub-test, the beams may be switched in between only two alternative beams such as, for example, in between Beam 1 and Beam 2. Alternatively, more beams may also be used in the test.

At operation 6, the NCR 305 (e.g., NCR-MT) may decode the beam indication command (i.e., beam change indication sent at operation 5). At operation 7, the NCR-MT 305 may provide feedback to the SS 300 indicating whether the beam indication command transmitted at operation 5 was received and demodulated. In some example embodiments, when the beam indication is sent over PDSCH, the feedback may be provided in the form of HARQ ACK/NACK feedback. The SS may also be capable of PUCCH reception. Further, the UL connection may be lossless in this example embodiment. In other example embodiments, the feedback may be provided by other means such as, for example, through the direct (conducted) feedback from the NCR-MT 305.

At operation 8, after the beam indication is demodulated by the NCR-MT 305, the NCR-Fwd may switch the access link beam. The beam switch may have some inherited delay defined by a requirement. For example, for DCI command, k slots after the slot in which DCI is received where k is NCR capability which may be values defined in the TS, and the NCR 305 may signal these values when the NCR 305 connects to the network. For MAC-CE, the indicated information may be applied starting from the first slot that is after slot $$n+3N_{slot}^{subframe,\mu}.$$

At operation 9, the measurement equipment/receiver 310 measures and receives the signal at the access link. In certain example embodiments, the measurements may be OTA EIRP RF measurements. If the EIRP of the measured signal in the beam direction has changed, the measurement equipment/receiver 310 may indicate beam change to the SS 300. Additionally, the measurement equipment 310 may time-stamp and save the time of change so that the measurement equipment 310 may be used for the calculation of the beam switching delay at the NCR 305. However, in other example embodiments, the beam change may be verified with the change of the access link state from the ON state to the OFF state and/or back (i.e., based on the measurements of presence/absence of the signal transmission over the access link).

At operation 10, the measurement equipment/receiver 310 may not only measure, but also receive the PDSCH sent in operation 4, which may be forwarded by the NCR-Fwd of the NCR 305. In some example embodiments, the measurement equipment/receiver 310 may include two receiving probes oriented in the direction corresponding to different NCR-Fwd beams. In other example embodiments, the orientation of the single probe may be changed at the moment of the expected beam change. In further example embodiments, the measurement equipment/receiver 310 may conclude that a beam switching event has occurred based on the forwarded signal at the access link with a switch delay or ON/OFF state of the NCR-Fwd. For instance, the measurement equipment/receiver 310 may move from the original beam direction to the targeted beam direction, and perform measurements for signal presence.

At operations 11 and 13, the SS 300 and/or the measurement equipment/receiver 310 may accumulate the statistical information related to the beam indication and beam switching. The statistical information may include, for example, one or more of: a number of transmitted beam indications (Ni), a number of demodulated beam indications (Nd), a number of access link beam switches (Ns), or a list of time stamps (or radio symbol/slot indexes, etc.) when the beam switching was identified ({Ti}). In some example embodiments, if the time of the beam indication is known by the test design, the statistical information of the beam switching delays may also be collected by the measurement equipment/receiver 310.

At operation 12, the measurement equipment/receiver 310 may provide some (lossless or conducted) feedback to the SS 300 on the reception of forwarded data/PDSCH. In certain example embodiments, the feedback may include all demodulated data/bits, HARQ feedback, time intervals when PDSCH was received, or just an interface for data collection/aggregation in the SS 300. At operation 13, the SS 300 may accumulate the statistical information. Additionally, the SS 300 may calculate the test metrics, and compare the test metrics to the requirement based on the statistical information collected during the N sub-test. At operation 14, the SS 300 may determine whether the test has passed or not. For instance, the SS 300 may report the test metrics, which can indicate pass/fail of the test, or the SS 300 may report that the test as "pass" or "fail" based on the test metrics. The report may be sent to a technician performing the test, or it may be sent to a console of the SS 300.

According to certain example embodiments, for demodulation requirements, the test metric (Md) may be the probability of beam indication misdetection, evaluated based on Nd/Ni or on Ns/Ni at a given SNR over the C-link. If the Md is below a required value, then the test may be determined to have failed. According to other example embodiments, for combined or RRM tests, it may be required that the access beam is switched within a given time. In this example embodiment, if any of the measured Ti is above the required delay, the test may be determined to have failed.

Figure 4:
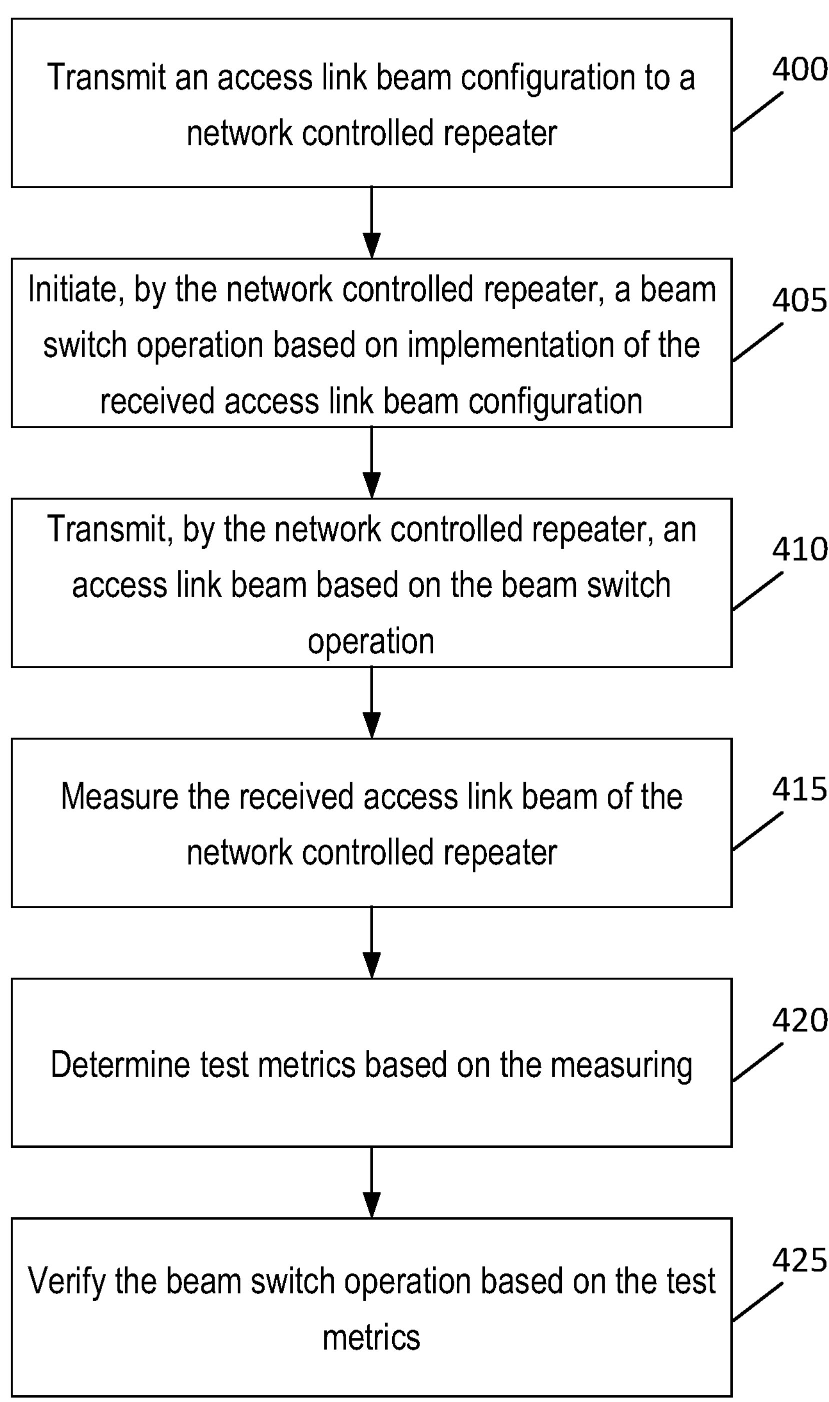
FIG. 4 illustrates an example flow diagram of a method, according to certain example embodiments.

FIG. 4 illustrates an example flow diagram of a method, according to certain example embodiments. In an example embodiment, the method of FIG. 4 may be performed by a network entity, or a group of multiple network elements in a 3GPP system, such as LTE or 5G-NR. For instance, in an example embodiment, the method of FIG. 4 may be performed by a combination of the SS, NCR, and measurement equipment/receiver similar to one of apparatuses 10, 20, or 30 illustrated in FIG. 5.

According to certain example embodiments, the method of FIG. 4 may include, at 400, transmitting an access link beam configuration to a NCR. The method may also include, at 405, initiating, by the NCR, a beam switch operation based on implementation of the received access link beam configuration. The method may further include, at 410, transmitting, by the NCR, an access link beam based on the beam switch operation. In addition, the method may include, at 415, measuring the received access link beam of the NCR. The method may also include, at 420, determining test metrics based on the measuring. Further, the method may include, at 425, verifying the beam switch operation based on the test metrics.

According to certain example embodiments, initiating the beam switch operation may include transmitting a beam switch indication to the NCR indicating command of a beam switch of the access link beam. According to some example embodiments, the beam switch indication may be transmitted as DCI over a PDCCH, or with a MAC-CE over a PDSCH. According to other example embodiments, determining the test metrics may include obtaining statistical data related to the beam switch indication and the beam switch. According to further example embodiments, the statistical data comprises at least one of a number of transmitted beam indications, a number of demodulated beam indications, a number of access link beam switches, a list of time stamps when a beam switch was identified, or a list of time stamps when the beam switch indication was transmitted from a system simulator.

In certain example embodiments, the test metrics may be based at least on measurements comprising at least one of a power output of the beam switch, reception of physical downlink shared traffic received from the NCR, or a beam switching delay time. In some example embodiments, the method may also include receiving feedback from the network controlled repeater confirming demodulation of the beam indication. In other example embodiments, the feedback may be received via a wired connection. In further example embodiments, the feedback may be a HARQ ACK or NACK. According to certain example embodiments, the method may further include time-stamping and saving a time of the beam switch. According to some example embodiments, the beam switch may be verified with a change of an access link state from an ON state to an OFF state.

Figure 5:
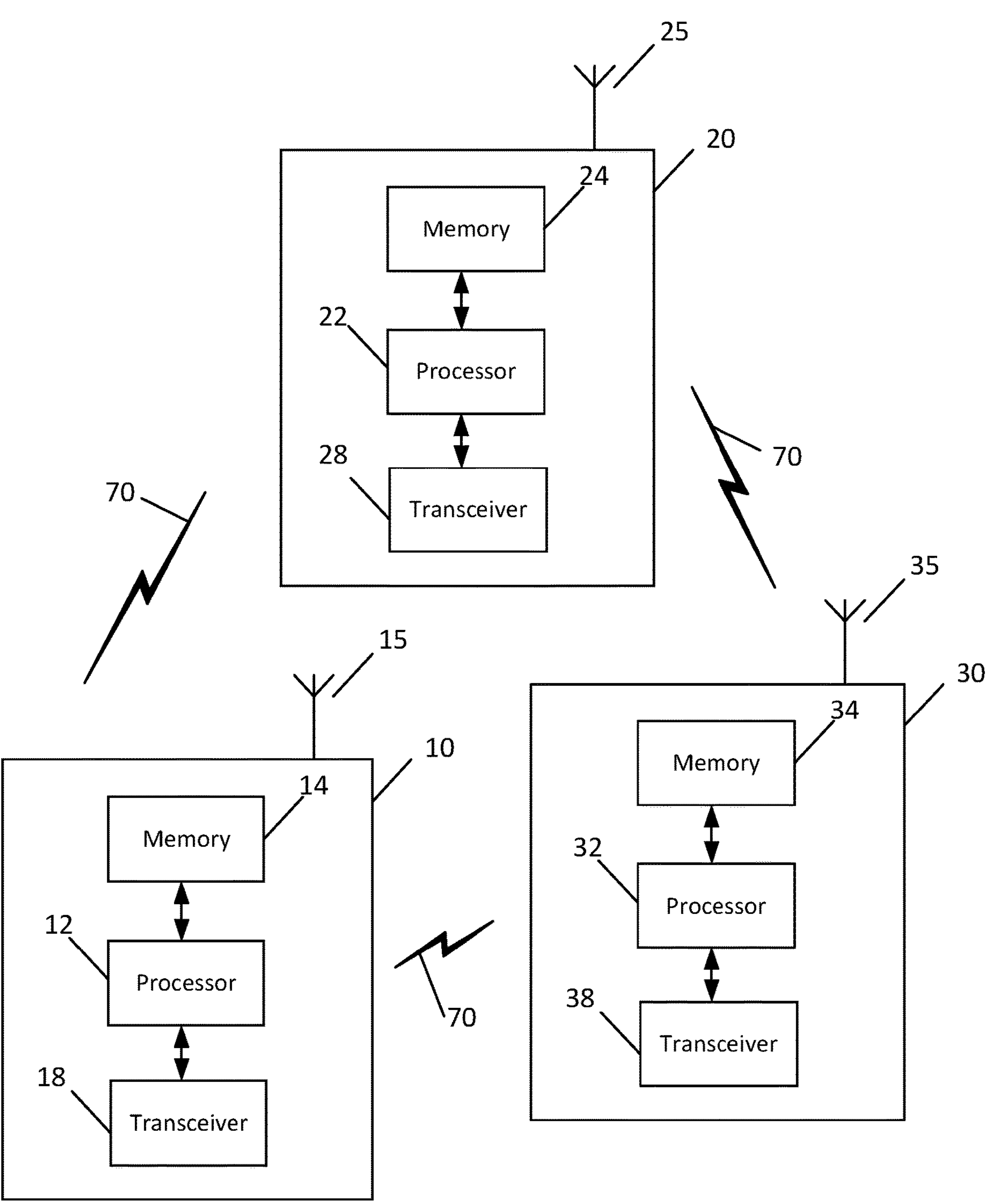
FIG. 5 illustrates a set of apparatuses, according to certain example embodiments.

FIG. 5 illustrates a set of apparatuses 10, 20, and 30 according to certain example embodiments. In certain example embodiments, apparatuses 10, 20, and 30 may be elements in a communications network or associated with such a network. For example, apparatus 10 may be an SS, apparatus 20 may be an NCR, and apparatus 30 may be a measurement equipment/receiver.

In some example embodiments, apparatuses 10, 20, and 30 may include one or more processors, one or more computer-readable storage medium (for example, memory, storage, or the like), one or more radio access components (for example, a modem, a transceiver, or the like), and/or a user interface. In some example embodiments, apparatuses 10, 20, and 30 may be configured to operate using one or more radio access technologies, such as Global System for Mobile Communications (GSM), Long-Term Evolution (LTE), LTE-Advanced (LTE-A), New Radio (NR), 5G, Integrated Access and Backhaul (IAB), Wireless Local Area Network (WLAN), Wi-Fi, Narrowband Internet of Things (NB-IoT), Bluetooth, near field communication (NFC), MulteFire, and/or any other radio access technologies. It should be noted that one of ordinary skill in the art would understand that apparatuses 10, 20, and 30 may include components or features not shown in FIG. 5.

As illustrated in the example of FIG. 5, apparatuses 10, 20, and 30 may include or be coupled to a processors 12, 22, and 32 for processing information and executing instructions or operations. Processors 12, 22, and 32 may be any type of general or specific purpose processor. In fact, processors 12, 22, and 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processors 12, 22, and 32 is shown in FIG. 5, multiple processors may be utilized according to other example embodiments. For example, it should be understood that, in certain example embodiments, apparatuses 10, 20, and 30 may include two or more processors that may form a multiprocessor system (e.g., in this case processors 12 may represent a multiprocessor) that may support multiprocessing. According to certain example embodiments, the multiprocessor system may be tightly coupled or loosely coupled (e.g., to form a computer cluster).

Processors 12, 22, and 32 may perform functions associated with the operation of apparatuses 10, 20, and 30 including, as some examples, precoding of antenna gain/phase parameters, encoding and decoding of individual bits forming a communication message, formatting of information, and overall control of the apparatuses 10, 20, and 30, including processes and examples illustrated in FIGS. 1-4.

Apparatuses 10, 20, and 30 may further include or be coupled to a memories 14, 24, and 34 (internal or external), which may be respectively coupled to processors 12, 24, and 34 for storing information and instructions that may be executed by processors 12, 24, and 34. Memories 14, 24, and 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memories 14, 24, and 34 can be comprised of any combination of random access memory (RAM), read only memory (ROM), static storage such as a magnetic or optical disk, hard disk drive (HDD), or any other type of non-transitory machine or computer readable media. The instructions stored in memories 14, 24, and 34 may include program instructions or computer program code that, when executed by processors 12, 22, and 32, enable the apparatuses 10, 20, and 30 to perform tasks as described herein.

In certain example embodiments, apparatuses 10, 20, and 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 12, 22, and 32 and/or apparatuses 10, 20, and 30 to perform any of the methods and examples illustrated in FIGS. 1-4.

In some example embodiments, apparatuses 10, 20, and 30 may also include or be coupled to one or more antennas 15, 25, and 35 for receiving a downlink signal and for transmitting via an UL from apparatuses 10, 20, and 30. Apparatuses 10, 20, and 30 may further include a transceivers 18, 28, and 38 configured to transmit and receive information. The transceivers 18, 28, and 38 may also include a radio interface (e.g., a modem) coupled to the antennas 15, 25, and 35. The radio interface may correspond to a plurality of radio access technologies including one or more of GSM, LTE, LTE-A, 5G, NR, IAB, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceivers 18, 28, and 38 may be configured to modulate information on to a carrier waveform for transmission by the antennas 15, 25, and 35 and demodulate information received via the antenna 15, 25, and 35 for further processing by other elements of apparatuses 10, 20, and 30. In other example embodiments, transceivers 18, 28, and 38 may be capable of transmitting and receiving signals or data directly. Additionally or alternatively, in some example embodiments, apparatus 10 may include an input and/or output device (I/O device). In certain example embodiments, apparatuses 10, 20, and 30 may further include a user interface, such as a graphical user interface or touchscreen.

In certain example embodiments, memories 14, 24, and 34 store software modules that provide functionality when executed by processors 12, 22, and 32. The modules may include, for example, an operating system that provides operating system functionality for apparatuses 10, 20, and 30. The memory may also store one or more functional modules, such as an application or program, to provide additional functionality for apparatuses 10, 20, and 30. The components of apparatuses 10, 20, and 30 may be implemented in hardware, or as any suitable combination of hardware and software. According to certain example embodiments, apparatuses 10, 20, and 30 may optionally be configured to communicate each other (in any combination) via a wireless or wired communication links 70 according to any radio access technology, such as NR.

According to certain example embodiments, processors 12, 22, and 32 and memories 14, 24, and 34 may be included in or may form a part of processing circuitry or control circuitry. In addition, in some example embodiments, transceivers 18, 28, and 38 may be included in or may form a part of transceiving circuitry.

For instance, in certain example embodiments, apparatus 10 may be controlled by memory 14 and processor 12 to transmit an access link beam configuration to a NCR. Apparatus 10 may also be controlled by memory 14 and processor 12 to initiate a beam switch operation based on implementation of the received access link beam configuration. Apparatus 10 may further be controlled by memory 14 and processor 12 to transmit an access link beam based on the beam switch operation. In addition, apparatus 10 may be controlled by memory 14 and processor 12 to measure the received access link beam of the NCR. Further, apparatus 10 may be controlled by memory 14 and processor 12 to determine test metrics based on the measuring. Apparatus 10 may also be controlled by memory 14 and processor 12 to verify the beam switch operation based on the test metrics.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for transmitting an access link beam configuration to a NCR. The apparatus may also include means for initiating a beam switch operation based on implementation of the received access link beam configuration. The apparatus may further include means for transmitting an access link beam based on the beam switch operation. In addition, the apparatus may include means for measuring the received access link beam of the NCR. Further, the apparatus may include means for determining test metrics based on the measuring. The apparatus may also include means for verifying the beam switch operation based on the test metrics.

Certain example embodiments described herein provide several technical improvements, enhancements, and/or advantages. For instance, in some example embodiments, it may be possible to introduce a way of testing for one of the core functionalities of the NCR node such as, for example, beam configuration and indication reception at the NCR-MT, and the consequences of beam switching at the access link of the NCR-Fwd.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G 5th Generation
5GCN 5G Core Network
5GS 5G System
BS Base Station
DL Downlink
EIRP Effective Isotropic Radiated Power
eNB Enhanced Node B
E-UTRAN Evolved UTRAN
gNB 5G or Next Generation NodeB
IAB Integrated Access and Backhaul
LTE Long Term Evolution
NCR Network-Controlled Repeaters
NCR-MT NCR-Mobile Termination
NCR-Fwd NCR-Forwarding
NR New Radio
NW Network
RF Radio Frequency
RRC Radio Resource Control
RRM Radio Resource Management
TS Testing System
UE User Equipment
UL Uplink

We claim:

1. A method, comprising:

transmitting an access link beam configuration to a network controlled repeater;

initiating, by the network controlled repeater, a beam switch operation based on implementation of the received access link beam configuration;

transmitting, by the network controlled repeater, an access link beam based on the beam switch operation;

measuring the received access link beam of the network controlled repeater;

determining test metrics based on the measuring; and verifying the beam switch operation based on the test metrics.

2. The method according to claim 1, wherein initiating the beam switch operation comprises transmitting a beam switch indication to the network controlled repeater indicating command of a beam switch of the access link beam.

3. The method according to claim 2, wherein the beam switch indication is transmitted as downlink control information over a physical downlink control channel, or with a medium access control element over a physical downlink shared channel.

4. The method according to claim 2, wherein determining the test metrics comprises obtaining statistical data related to the beam switch indication and the beam switch, and wherein the statistical data comprises at least one of a number of transmitted beam indications, a number of demodulated beam indications, a number of access link beam switches, a list of time stamps when a beam switch was identified, or a list of time stamps when the beam switch indication was transmitted from a system simulator.

5. The method according to claim 1, wherein the test metrics are based at least on measurements comprising at least one of the following:

a power output of the beam switch, reception of physical downlink shared traffic received from the network controlled repeater, or a beam switching delay time.

6. The method according to claim 1, further comprising:

receiving feedback from the network controlled repeater confirming demodulation of the beam indication.

7. The method according to claim 6, wherein the feedback is received via a wired connection.

8. The method according to claim 6, wherein the feedback is a hybrid automatic repeat request acknowledgment or a negative acknowledgment, and wherein the feedback is received over a physical uplink control channel.

9. The method according to claim 1, further comprising:

time-stamping and saving a time of the beam switch.

10. The method according to claim 1, wherein the beam switch is verified with a change of an access link state from an ON state to an OFF state.

11. An apparatus, comprising:

at least one processor; and at least one memory comprising computer program code, the at least one memory and the computer program code configured to, with storing instructions that, when executed by the at least one processor, cause the apparatus at least to perform:

transmitting an access link beam configuration to a network controlled repeater;

initiating a beam switch operation based on implementation of the received access link beam configuration;

transmitting an access link beam based on the beam switch operation;

measuring the received access link beam of the network controlled repeater;

determining test metrics based on the measuring; and verifying the beam switch operation based on the test metrics.

12. The apparatus according to claim 11, wherein initiating the beam switch operation comprises transmitting a beam switch indication to the network controlled repeater indicating command of a beam switch of the access link beam.

13. The apparatus according to claim 12, wherein the beam switch indication is transmitted as downlink control information over a physical downlink control channel, or with a medium access control element over a physical downlink shared channel.

14. The apparatus according to claim 12, wherein determining the test metrics comprises obtaining statistical data related to the beam switch indication and the beam switch, and wherein the statistical data comprises at least one of a number of transmitted beam indications, a number of demodulated beam indications, a number of access link beam switches, a list of time stamps when a beam switch was identified, or a list of time stamps when the beam switch indication was transmitted from a system simulator.

15. The apparatus according to claim 11, wherein the test metrics are based at least on measurements comprising at least one of the following:

a power output of the beam switch, reception of physical downlink shared traffic received from the network controlled repeater, or a beam switching delay time.

16. The apparatus according to claim 11, wherein the apparatus is further caused to perform at least:

receiving feedback from the network controlled repeater confirming demodulation of the beam indication.

17. The apparatus according to claim 16, wherein the feedback is received via a wired connection.

18. The apparatus according to claim 16, wherein the feedback is a hybrid automatic repeat request acknowledgment or a negative acknowledgment, and wherein the feedback is received over a physical uplink control channel.

19. The apparatus according to claim 11, wherein the apparatus is further configured to perform at least:

time-stamping and saving a time of the beam switch.

20. The apparatus according to claim 11, wherein the beam switch is verified with a change of an access link state from an ON state to an OFF state.

* * * * *